(12) United States Patent
Shirota

(10) Patent No.: US 7,147,333 B2
(45) Date of Patent: Dec. 12, 2006

(54) PROJECTOR

(75) Inventor: Kei Shirota, Saitama (JP)

(73) Assignee: Fujinon Corporation, Saitama (JP)

( * ) Notice: Subject to any disclaimer, the term of this patent is extended or adjusted under 35 U.S.C. 154(b) by 200 days.

(21) Appl. No.: 11/036,091

(22) Filed: Jan. 18, 2005

(65) Prior Publication Data

US 2005/0162621 A1    Jul. 28, 2005

(30) Foreign Application Priority Data

Jan. 22, 2004    (JP) .............................. 2004-014540

(51) Int. Cl.
*G02B 7/18* (2006.01)

(52) U.S. Cl. ........................... 353/81; 353/33; 349/58; 359/831

(58) Field of Classification Search .................. 353/31, 353/33, 34, 37, 81, 119, 122; 349/57, 58; 359/831

See application file for complete search history.

(56) References Cited

U.S. PATENT DOCUMENTS

| 5,624,174 | A | * | 4/1997 | Loucks ........................ 353/122 |
| 5,653,522 | A | * | 8/1997 | Loucks ........................ 353/122 |
| 5,868,485 | A | * | 2/1999 | Fujimori et al. ............. 353/119 |
| 6,056,407 | A | * | 5/2000 | Iinuma et al. ............... 353/119 |
| 6,322,217 | B1 | * | 11/2001 | Fujimori et al. ............. 353/31 |
| 6,406,151 | B1 | * | 6/2002 | Fujimori ..................... 353/119 |
| 6,416,187 | B1 | * | 7/2002 | Menard ....................... 353/122 |
| 6,587,167 | B1 | | 7/2003 | Fujimori et al. |
| 6,592,226 | B1 | * | 7/2003 | Fujimori ...................... 353/31 |
| 6,616,282 | B1 | * | 9/2003 | Ozawa ........................ 353/33 |
| 6,834,964 | B1 | * | 12/2004 | Nishihara et al. ............. 353/52 |
| 6,854,848 | B1 | * | 2/2005 | Fujimori et al. .............. 353/20 |
| 6,866,389 | B1 | * | 3/2005 | Ito et al. ...................... 353/119 |
| 6,906,840 | B1 | * | 6/2005 | Fujimori et al. ............. 359/237 |
| 6,935,745 | B1 | * | 8/2005 | Kitabayashi et al. .......... 353/20 |
| 6,961,165 | B1 | * | 11/2005 | Uehara ........................ 359/237 |
| 7,004,590 | B1 | * | 2/2006 | Kitabayashi ................ 353/121 |
| 2002/0131026 | A1 | * | 9/2002 | Fujimori ..................... 353/119 |
| 2003/0189676 | A1 | | 10/2003 | Kato et al. |
| 2004/0150800 | A1 | * | 8/2004 | Uehara et al. ............... 353/119 |

FOREIGN PATENT DOCUMENTS

JP        3360804        10/2002

\* cited by examiner

*Primary Examiner*—William C. Dowling
(74) *Attorney, Agent, or Firm*—Arnold International; Bruce Y. Arnold

(57) ABSTRACT

In a base plate, projections for being inserted into openings in a lower bracket, and for supporting a bottom surface of a cross-dichroic prism, are provided. The lower bracket and the cross-dichroic prism are fixed to the base plate by adhesive agent filled into a clearance between the lower bracket and the bottom surface of the cross-dichroic prism supported on the projections. Holes are provided on a liquid-crystal panel, and holding arms provided on an upper bracket and the lower bracket are inserted into the holes. Then the adhesive agent is applied into the holes to fix the liquid-crystal display to the upper and lower brackets.

14 Claims, 6 Drawing Sheets

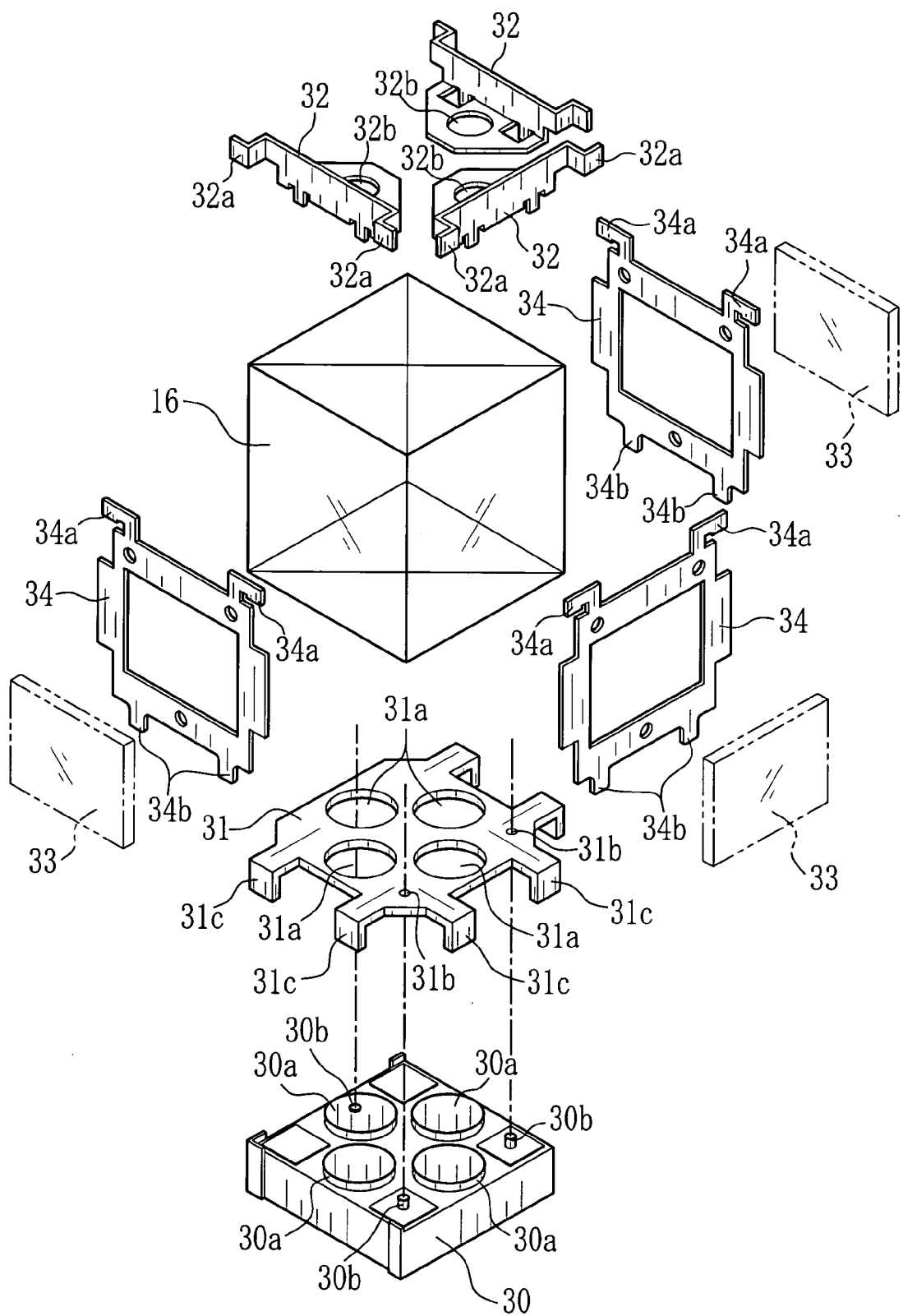

PROJECTOR

BACKGROUND OF THE INVENTION

1. Field of the Invention

The present invention relates to a projector assembled such that an image display device such as a liquid-crystal panel is integrally held around a prism for composing or decomposing light beams.

2. Description Related to the Prior Art

It is well known three-panel type liquid-crystal projectors which decompose the white light into red light, green light, and blue light, modulate the three color light to an image light by using image display devices corresponding to respective color light, and then compose the three color image lights and project the composed image light. For example, in a three-panel type liquid-crystal projector having liquid-crystal panels of transmissive type, a cross-dichroic prism having two dichroic surfaces which are orthogonal to each other composes three color light beams having passed through each liquid-crystal panel. The cross-dichroic prism has a rectangular solid shape, and each liquid-crystal panel is disposed so as to face each of three side surfaces of the cross-dichroic prism. A composed light beam enters a projection lens from a remaining side surface of the prism to which the liquid-crystal panel did not face. In addition, as disclosed in Laid-Open United States Patent Application 2003/0189676, it is known a three-panel type liquid-crystal projector in which light beams decomposed by a polarizing beam splitter enter liquid-crystal panels of reflective type disposed so as to face side surfaces of the polarizing beam splitter.

To assemble these types of projectors, it is known that the liquid-crystal panels are integrally held with an optical element having the rectangular solid shape, such as the cross-dichroic prism and the polarizing beam splitter. For example, to eliminate the use of frames to be adhered to side surfaces of a prism, U.S. Pat. No. 6,587,167 discloses fixing pins having a flat surface at one end to be adhered to a side surface of a prism, and a liquid-crystal panel with holes, in which the fixing pins are inserted. The liquid-crystal panel is fixed to the prism such that between the hole and outer peripheral surface of the fixing pin, and between the flat surface of the fixing pin and the side surface of the prism are respectively adhered by adhesive agent. As another example, in Japanese Patent 3360804, a liquid-crystal panel is screwed or adhered to an upper holder and a lower holder which are fixed on upper and bottom surfaces of a prism, instead of fixing the liquid-crystal panel directly to the side surface of the cross-dichroic prism as the conventional method.

However, in the above described prior arts, because the bottom surface of the cross-dichroic prism is adhered directly to a base plate, an adhesive layer formed in between can be uneven in thickness. In this case, the prism does not stand upright but lean to any side on the base plate. Accordingly, light beams exit from the prism are distorted. In this state, proper projection performance cannot be obtained even if a position of the liquid-crystal display for attaching to the prism is changed. To obtain the proper projection performance, there are needs to detach the base plate and the liquid-crystal panels from the prism to which they are adhered, and to reassemble these disassembled components. This process consumes considerable time.

SUMMARY OF THE INVENTION

An object of the present invention is to provide a projector in which a base plate and so on can be attached to a cross-dichroic prism with accuracy, and disassemble and reassemble can be easy.

In order to achieve the above object, a projector of the present invention comprises a columnar prism having a dichroic surface which outputs light beams in a direction different from an entering direction of the light beam according to their polarization characteristics and wavelength, a base plate having a first projection which supports a bottom surface of the prism, holding means including a first bracket fixed on a top surface of the prism and a second bracket fixed on the bottom surface of the prism for holding a image display device such that the image display device faces a side surface of the prism, a first opening formed on the second bracket for fitting to the first projection so as to position the second bracket on the base plate, and an adhesive layer formed with adhesive agent filled into a clearance between the bottom surface of the prism supported on the first projection and the second bracket so as to fix the bottom surface of the prism, the base plate and the second bracket integrally.

It is preferable that the adhesive agent is UV curable resin.

Also, it is preferable that the first bracket has the same shape as the second bracket, and is fixed on the top surface of the prism.

Also, it is preferable that the first and second brackets respectively have a pair of holding arms extending to project approximately perpendicular to the side surface of the prism. These holding arms are inserted into holes formed on the image display device, to hold the image display device.

According to the present invention, the space for the adhesive layer is formed with the prism and the base plate being closely contact to each other because of the projection formed on the base plate for supporting the prism. Therefore, the prism is never inclined by uneven thickness of the adhesive layer when being fixed to the base plate, because the prism can be positioned to the base plate before fixing. And time for assembling can be reduced because the second bracket for holding the image display device is easily positioned owing to the projection, and a process for fixing the bracket to the base plate and a process for fixing the prism to the base plate can be performed at the same time. In addition, manufacturing cost can be reduced because the prism having smaller size can be used in comparison with a case that frames and so on are fixed to a side surface of a prism optically polished.

A time for fixation (curing) can be substantially shortened by using the UV curing resin as the adhesive agent, in comparison with the conventional methods of using epoxy resin to fix a frame to a side surface of a prism, and using silicon resin to fix a base plate to a bottom surface of a prism.

The manufacturing cost is further reduced by that the first bracket and the second bracket have the same shape. Although the first bracket which is not fixed by the base plate should be adhered to the prism, the first bracket can be fixed with closely contacting with the prism by the adhesive agent being applied to an opening formed on the first bracket.

Because the holes where the holding arms are inserted are provided on the image display device to fix the image display device to the first and the second bracket, the liquid-crystal panel can be moved in a clearance between the hole and the holding arm. Therefore, fine adjustment of the position of the image display device can be easily performed.

BRIEF DESCRIPTION OF THE DRAWINGS

The above objects and advantages of the present invention will become easily understood by one of ordinary skill in the art when the following detailed description would be read in connection with the accompanying drawings.

FIG. 7 is an exploded perspective view showing a second embodiment of the present invention.

PREFERRED EMBODIMENTS OF THE INVENTION

Figure 1:
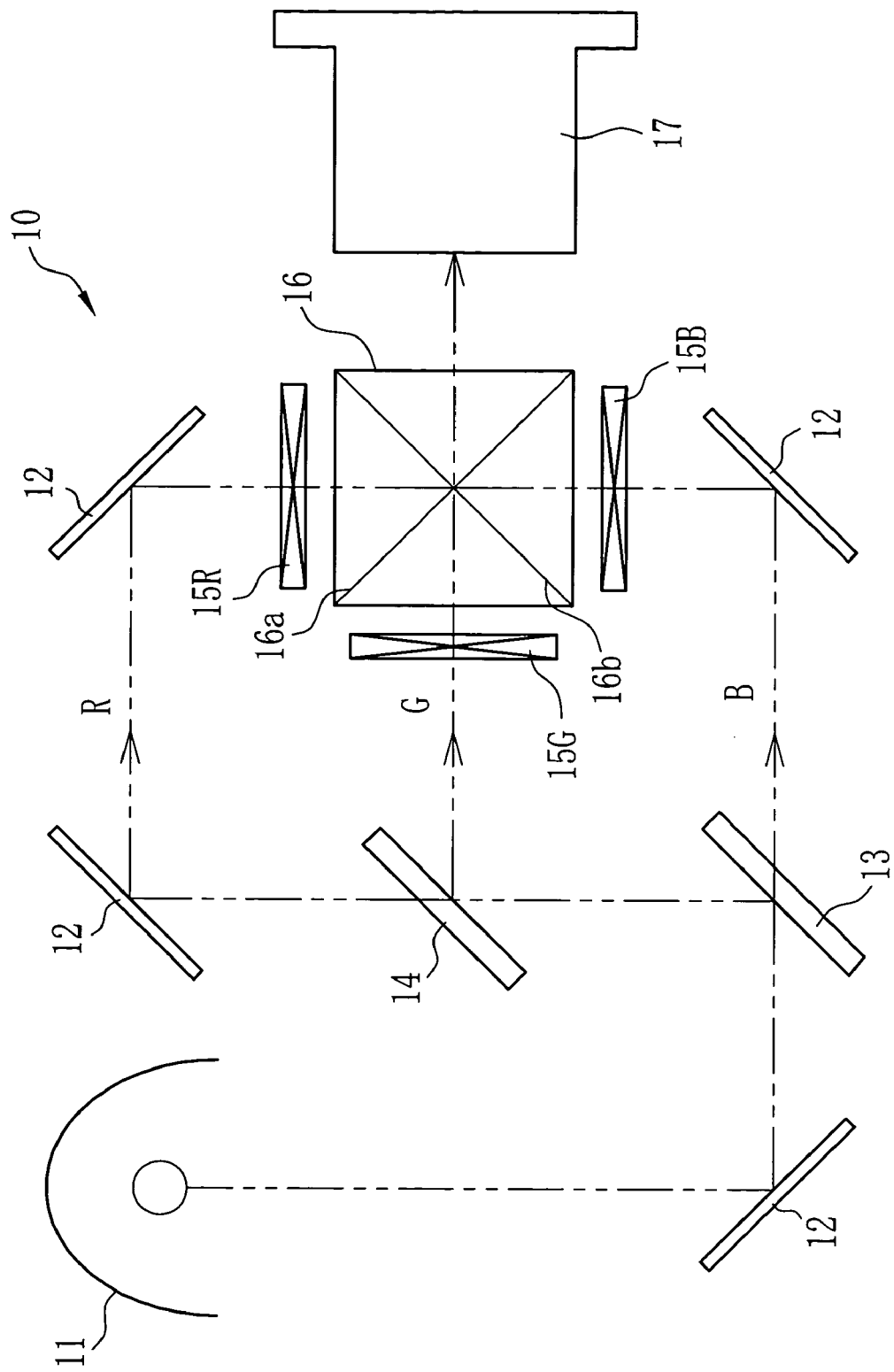
FIG. 1 is a schematic view illustrates a configuration of a projector.

In FIG. 1, a liquid-crystal projector 10 has an illuminating light source 11, plural reflecting mirrors 12, dichroic mirrors 13, 14, three liquid-crystal panels 15R, 15G, 15B of transmissive type, a cross-dichroic prism 16, and a projection lens 17. White high-intensity light emitted from the illuminating light source 11 is formed to a light beam which has even illuminance by an illuminating optical system (not shown), and enters the dichroic mirror 13.

The dichroic mirror 13 divides blue light (B light) from the white light, by transmitting the B light and reflecting red light (R light) and green light (G light). The divided B light enters the liquid-crystal panel 15B. The R light and the G light reflected from the dichroic mirror 13 enter to the dichroic mirror 14. The dichroic mirror 14 transmits the R light and reflects the G light to divide the R light and the G light. The R light and the G light respectively enter the liquid-crystal panel 15R and the liquid-crystal panel 15G.

The liquid-crystal panel 15R, 15G, 15B respectively modulate the R light, G light, and B light, into respective image lights. The light beams which passed through the liquid-crystal panels 15R, 15G, 15B enter the cross-dichroic prism 16. The cross-dichroic prism 16 is composed of four right angle prisms, and has two types of dichroic mirrors, the one is an R light reflecting surface 16a which reflects the R light, and the other is a B light reflecting surface 16b which reflects the B light. The R light reflecting surface 16a and the B light reflecting surface 16b are at right angles to each other.

The R light passed through the liquid-crystal panel 15R is reflected perpendicularly by the R light reflecting surface 16a, and enters the projection lens 17. The G light passed through the liquid-crystal panel 15G passes straight through the R light reflecting surface 16a and the B light reflecting surface 16b and enters the projection lens 17. The B light passed through the liquid-crystal panel 15B is reflected perpendicularly by the B light reflecting surface 16b, and enters the projection lens 17. The projection lens 17 enlarges and projects the image light composed from each color light beam by the cross-dichroic prism 16, on a screen.

Figure 2:
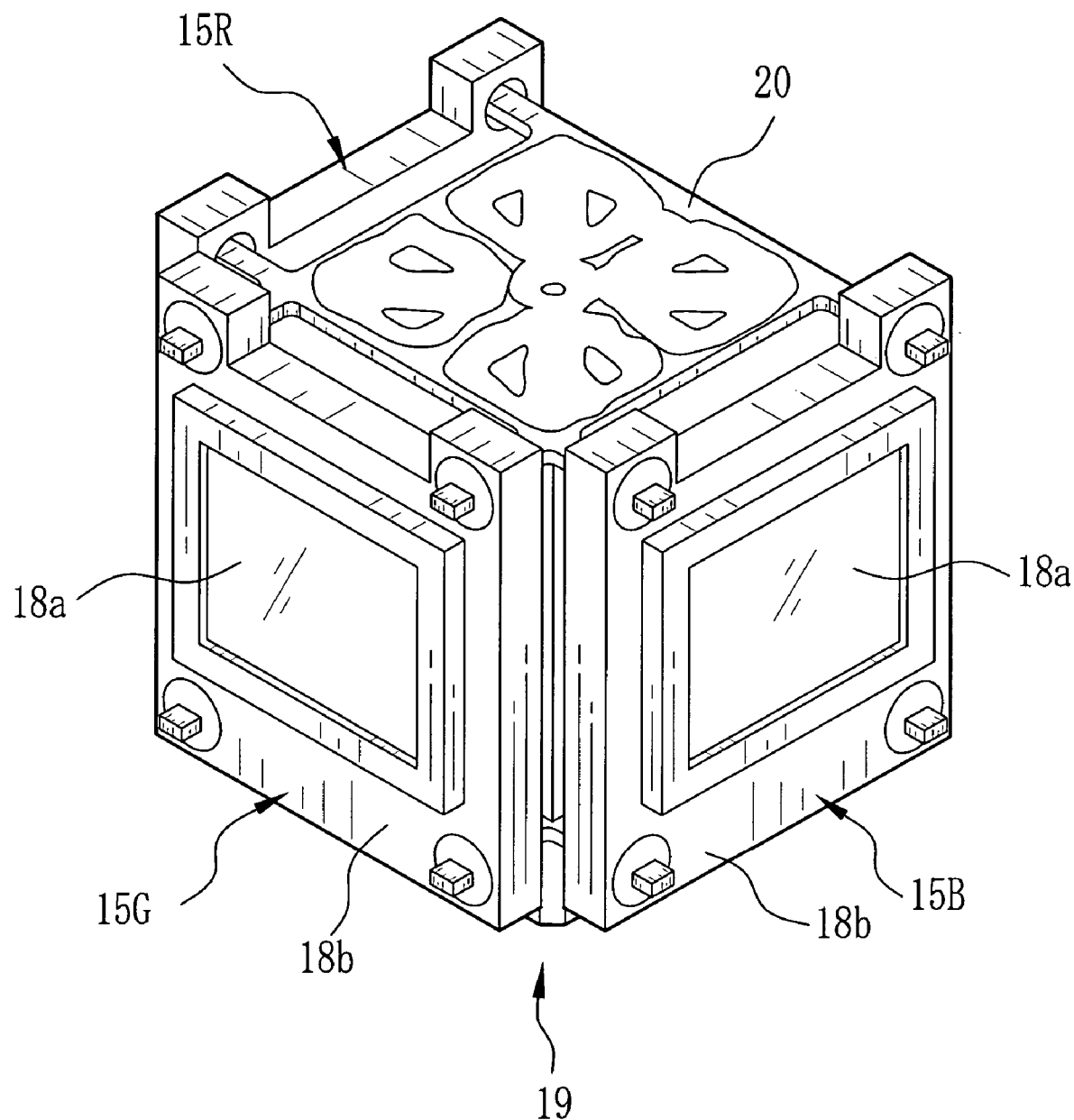
FIG. 2 is a perspective view showing liquid-crystal panels integrally held with a prism.

In FIG. 2, the liquid-crystal panels 15R, 15G, 15B have a structure that a frame body 18b covers around a liquid-crystal element 18a. The liquid-crystal panels are integrally held with the cross-dichroic prism 16 to form a prism unit 19. In the prism unit 19, each liquid-crystal panel is disposed such that each liquid-crystal element 18a faces to each side surface of the cross-dichroic prism 16 which has a rectangular solid shape.

Figure 3:
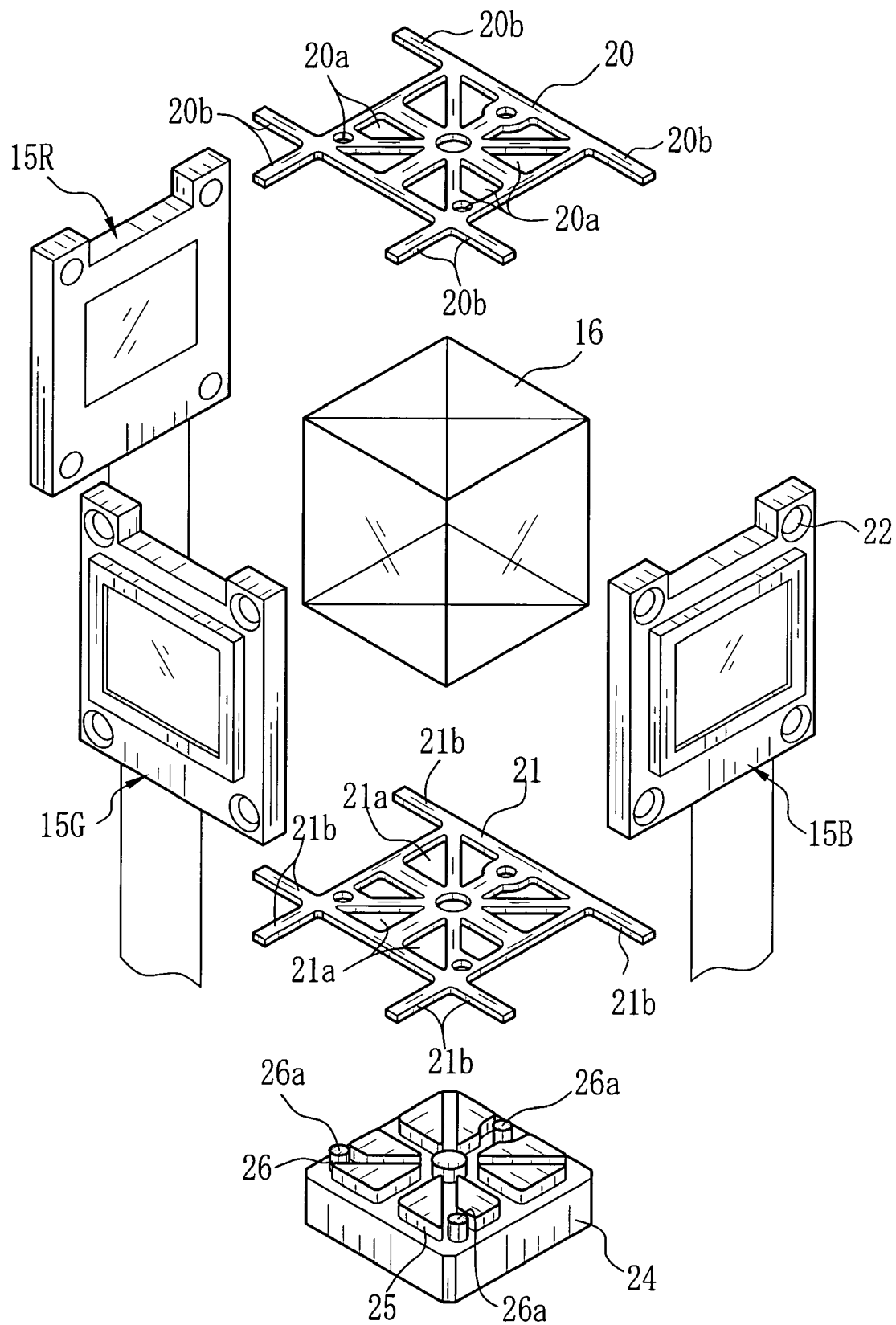
FIG. 3 is an exploded perspective view showing a mechanism to integrally hold the liquid-crystal panels with the prism.

In FIG. 3, an upper bracket 20 and a lower bracket 21 are disposed respectively on a top surface and a bottom surface of the cross-dichroic prism 16. The upper bracket 20 and the lower bracket 21 have the same shape of approximately square thin plate-form. The upper bracket 20 and the lower bracket 21 are made of metal manufactured by sheet-pressing, or made of plastic manufactured by plastic molding as usage. In the upper bracket 20 and the lower bracket 21, circular openings 20a and approximately triangular openings 21a are formed, and three pairs of holding arms 20b, 21b are provided to extend respective sides of the square.

The liquid-crystal panels 15R, 15G, 15B are attached to the upper bracket 20 and the lower bracket 21 through the holding arms 20b and 21b. In respective liquid-crystal panels 15R, 15G, 15B, four holes 22, in which the holding arms 20b and 21b are inserted, are provided. Each hole 22 is provided near each corner of the rectangular liquid-crystal surface. Each liquid-crystal panels is fixed to the upper bracket 20 and the lower bracket 21 such that the holes 22 are filled with adhesive agent after the holding arms 20b and 21b are inserted into the holes.

A base plate 24 is an interface for fixation of the cross-dichroic prism 16 to an optical unit, in which the reflecting mirrors 12 and the dichroic mirrors 13, 14 are mounted. Note that the cross-dichroic prism 16 is not limited to be fixed by the base plate 24 which is detachable from the optical unit, and also may be fixed by a base integrated with the optical unit as a single-member. On the top surface of the base plate 24, plural first projections 25 which are approximately triangle poles and three second projections 26 which are circular cylinders are provided. The second projection 26 is taller than the first projection 25, and has a flat supporting surface 26a on the top thereof for supporting the bottom surface of the cross-dichroic prism 16. And approximately radial pattern of grooves are formed between plural projections 25, 26, on the top surface of the base plate 24.

The two-dimensional shape of the projections 25, 26 in plan view is the same as that of the openings 21a provided in the lower bracket 21. The lower bracket 21 is positioned to be sandwiched between the base plate 24 and the cross-dichroic prism 16, by that the openings 21a are fitted onto the projections 25 and 26.

Figure 4:
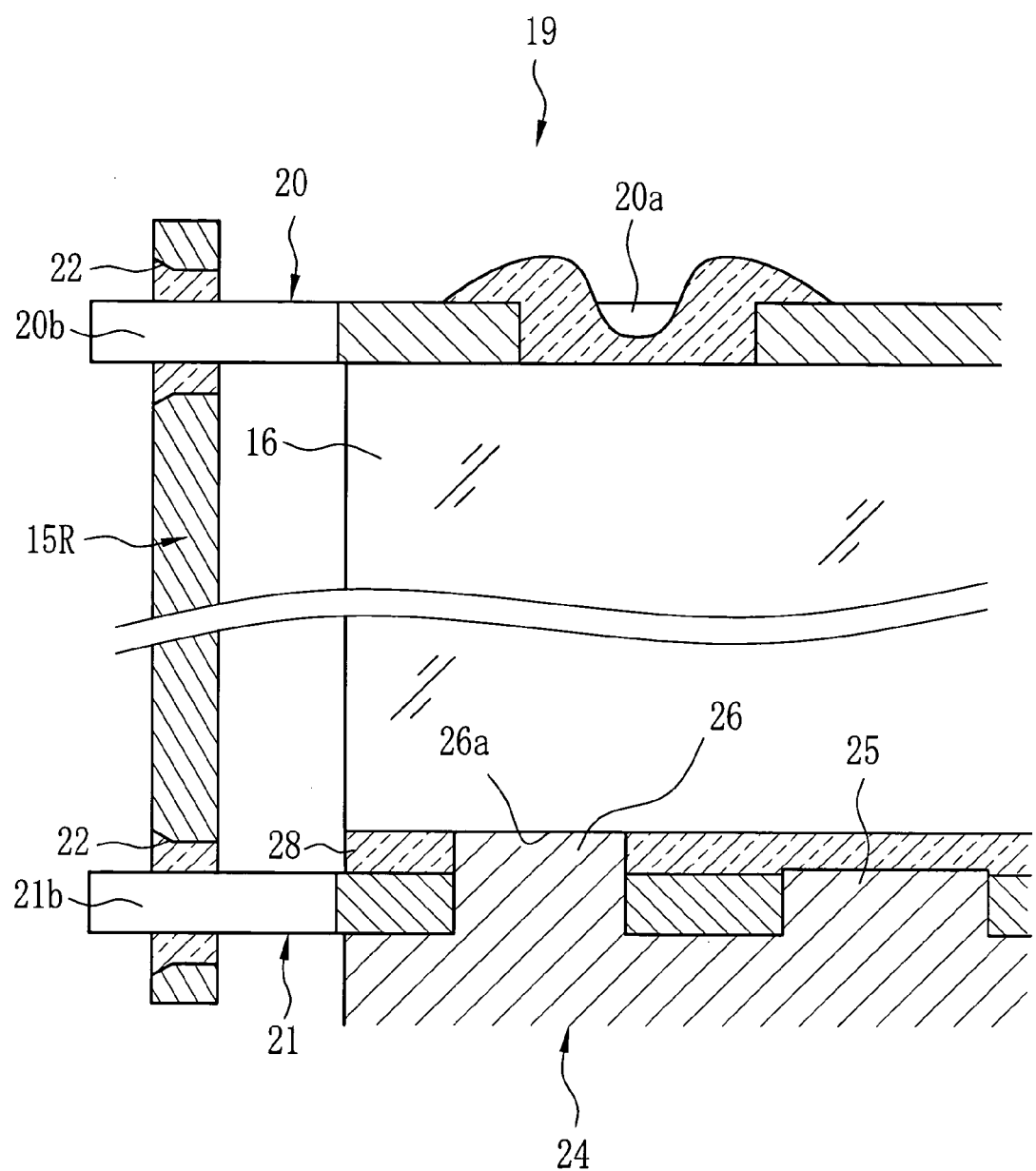
FIG. 4 is a cross-sectional view illustrating positions of a base plate, upper and lower brackets, and the prism.

In FIG. 4, the height of the second projections 26 is larger than the thickness of the lower bracket 21. In addition, an adhesive layer 28 is formed between the cross-dichroic prism 16 and the lower bracket 21 by filling UV curable resin as the adhesive agent there. By the adhesive layer 28, the cross-dichroic prism 16 and the lower bracket 21 are fixed to the base plate 24. The upper bracket 20 is fixed to the cross-dichroic prism 16 such that the adhesive agent is applied along the periphery of the openings 20a when the upper bracket 20 closely contacts to the top surface of the cross-dichroic prism 16. The position of the upper bracket 20 on the cross-dichroic prism 16 is determined according to the position of the lower bracket 21 determined by the base plate 24.

The liquid-crystal panel 15R is integrally held with the cross-dichroic prism 16 by that the upper bracket 20 and the lower bracket 21 are fixed to the cross-dichroic prism 16, then the holding arms 20b, 21b are inserted into the holes 22, and then the adhesive agent filled into the holes 22 is cured. The liquid-crystal panels 15G and 15B are also integrally held with the cross-dichroic prism 16 by the same process. Because the diameter of the hole 22 is larger than that of the holding arms 20b and 21b, the liquid-crystal panels can be moved in both a vertical direction and a horizontal direction. Therefore, the positions of each liquid-crystal panel can be adjusted such that each color projected image is positioned correctly in pixel.

Figure 5:
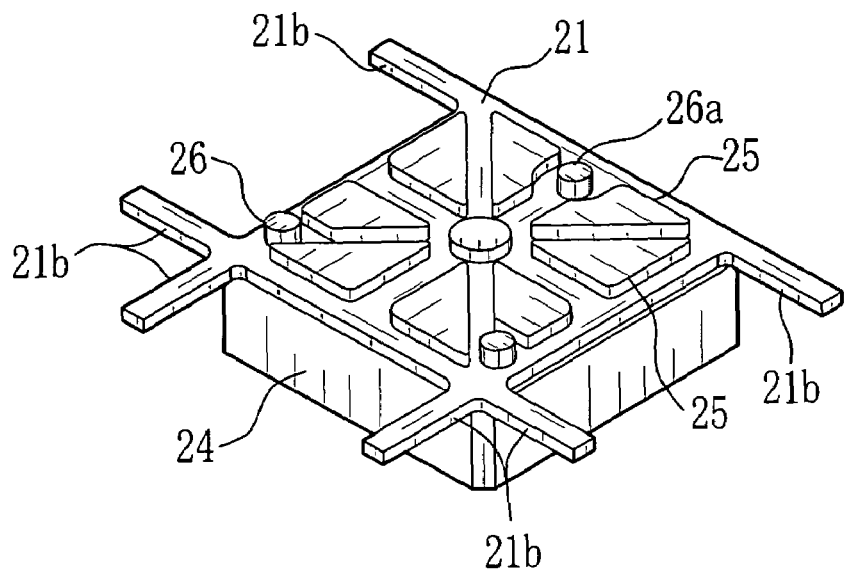
FIG. 5 is a perspective view showing the base plate and the lower bracket which are assembled.

Next, a process for fixation of the liquid-crystal panels 15R, 15G, 15B to the cross-dichroic prism 16 is described. As shown in FIG. 5, the lower bracket 21 is attached to the base plate 24. The orientation of the lower bracket 21 is determined such that the shapes of the openings 21a correspond with those of the projections 25, 26. The projections 25, 26 are fitted on the lower bracket 21 by being inserted into the openings 21a. The supporting surfaces 26a of the second projections 26 project from the lower bracket 21, for supporting the cross-dichroic prism 16 on there.

Figure 6:
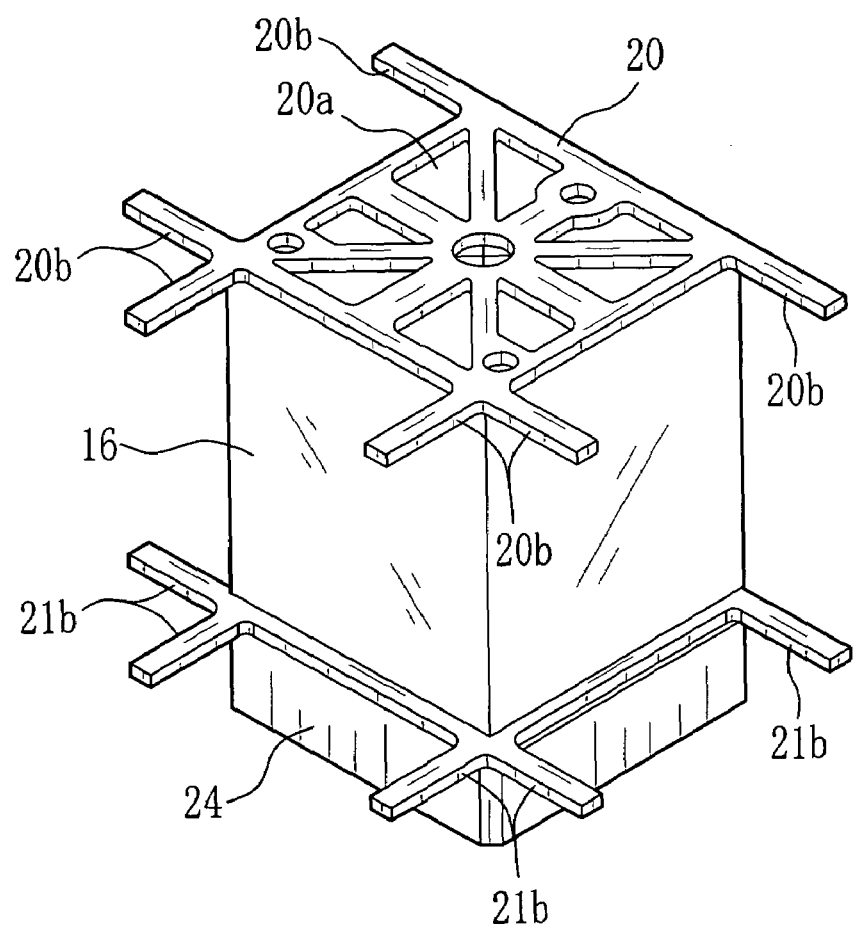
FIG. 6 is a perspective view showing an assembly of the base plate, the brackets, and the prism.

As shown in FIG. 6, the cross-dichroic prism 16 closely contacts to the second projections 26, and is supported to be upstanding accurately perpendicular to the base plate 24. The upper bracket 20 is mounted on the cross-dichroic prism 16 and is determined its position according to the position of the lower bracket 21. The base plate 24, the lower bracket 21, the cross-dichroic prism 16, and the upper bracket 20, which are stacked, are temporally fixed not to be moved from each other, by for example that these members are held from upper and lower portions thereof by jigs and so on. In this state, the UV curable resin as the adhesive agent is injected into the space between the lower bracket 21 and the cross-dichroic prism 16. And the UV curable resin is also applied to the openings 20a of the upper bracket 20. Then, the UV curable resin is cured by being exposed to radiation of UV rays. Accordingly, the base plate 24, the lower bracket 21, the cross-dichroic prism 16, and the upper bracket 20 are fixed all together at the same time.

Then the liquid-crystal panels are attached to this assembly assembled by fixing the upper bracket 20 and the lower bracket 21 to the cross-dichroic prism 16 and the base plate 24. After the respective holding arms 20b, 21b of the upper and lower brackets 20, 21 are inserted into the respective holes 22 of the respective liquid-crystal panel, these liquid-crystal panels are held not to be moved by using, for example, particular jigs and so on. In this state, the respective color illuminating lights are applied to the respective liquid-crystal panels 15R, 15G, 15B, and the respective liquid-crystal panels 15R, 15G, 15B are driven to form the respective color image lights for being projected on a projection surface. Then the respective jigs which hold the respective liquid-crystal panels 15R, 15G, 15B are operated to adjust the positions of the liquid-crystal panels, such that color shifts and so on of the respective color images superimposed on the projection surface are eliminated by moving the respective liquid-crystal panels in the range of margin between the size of the holes 22 and the size of the holding arms 20b, 21b.

After adjusting the positions of the liquid-crystal panels such that the respective color images from the respective liquid-crystal panels are superimposed with accuracy, the UV curable resin is applied into the holes 22 where the holding arms 20b, 21b are inserted. Then the UV curable resin is cured by being exposed to radiation of UV rays such that the liquid-crystal panels 15R, 15G, 15B are fixed to the upper bracket 20 and the lower bracket 21.

After assembling the prism unit 19 is completed, final test of projection performance is executed. At this test, it is checked that whether there occurs the color shifts in the superimposed color images by that the liquid-crystal panels are moved accidentally from the adjusted position while curing the adhesive agent, and so on. If it is determined that the projection performance is improper, the prism unit 19 is disassembled and reassembled.

For separating the three liquid-crystal panels 15R, 15G, 15B from the cross-dichroic prism 16, the holding arms 20b and 21b are cut off from the upper bracket 20 and the lower bracket 21. Then the cut off portions of holding arms 20b, 21b and the cured adhesive agent are pushed out from the holes 22. Accordingly, the liquid-crystal panels 15R, 15G, 15B become able to be reassembled. After separating the liquid-crystal panels, the upper bracket 20 and the lower bracket 21 which have no holding arms are separated from the dichroic prism 16 and the base plate 24 by a mechanical process with using tools, or by a chemical process with using solvents. Finally, by cleansing the adhesive agent on the bottom surface of the cross-dichroic prism 16 and on the projections 25, 26 of the base plate 24, each component becomes able to be reassembled. Because only the upper and lower brackets 20 and 21 have to be changed with brand-new brackets, the cost for reassembling becomes cheaper.

Now a second embodiment of the present invention is explained. In FIG. 7, on a base plate 30, four first projections 30a which have cylindrical shape and three second projections 30b which are taller than the first projections 30a are provided. In a lower bracket 31, first openings 31a for being fitted onto the first projections 30a and second openings 31b for being fitted onto the second projections 30b are provided. The second projections 30b are projected from the lower bracket 31 when the lower bracket 31 is attached to the base plate 30, for supporting the bottom surface of the cross-dichroic prism 16.

On the top surface of the cross-dichroic prism 16, three upper brackets 32 are provided. The upper bracket 32 provides adhesion surfaces 32a for being adhered with an attachment frame 34 to which a liquid-crystal panel 33 is attached, and an opening 32b where the adhesive agent is applied to fix the upper bracket 31 on the cross-dichroic prism 16. The attachment frame 34 provides upper leg portions 34a for being adhered to the adhesion surfaces 32a of the upper bracket 32, and lower leg portions 34b for being adhered to adhesion surfaces 31c of the lower bracket 31. These respective attachment frames 34 hold the respective liquid-crystal panels 33 to face the respective three side surfaces of the cross-dichroic prism 16.

Next, a process for assembling these components is described. The lower bracket 31 is positioned on the base plate 30 such that the first openings 31a of the lower bracket 31 are fitted onto the first projections 30a of the base plate 30. The cross-dichroic prism 16 is disposed on supporting surfaces of the second projections 30b which project from the lower bracket 31. The orientation of the side surface of the cross-dichroic prism 16 is determined to be parallel with the adhesion surfaces 31c of the lower bracket 31. The adhesive agent is injected into the space between the lower bracket 31 and the bottom surface of the cross-dichroic prism 16. And then the adhesive agent is cured for fixing the lower bracket 31 and the cross-dichroic prism 16 to the base plate 30 at the same time.

The upper brackets 32 are positioned on the top surface of the cross-dichroic prism 16 such that the adhesion surfaces 32a thereof and the adhesion surfaces 31c of the lower bracket 31 are in the same plane. Then the adhesive agent is applied into the opening 32b and is cured to fix the upper bracket 32 to the cross-dichroic prism 16. The three upper brackets 32 are fixed one at a time, and after the all upper brackets 32 are fixed, the attachment frames 34 are fixed to the lower bracket 31 and the upper bracket 32.

After the liquid-crystal panel 33 is attached on the attachment frame 34, the adhesive agent is applied to the upper leg portions 34a and the lower leg portions 34b, and these portions are closely contacted to the adhesion surfaces 31c, 32a of the upper and lower brackets 31, 32. As with the above described first embodiment, the adhesive agent is cured after adjusting the positions of the three liquid-crystal panels such that the respective color images from the respective liquid-crystal panels are superimposed with accuracy. Accordingly, the all liquid-crystal panels are integrally held with the cross-dichroic prism 16 through the upper and lower brackets 31 and 32.

Note that in the above embodiments, the transmissive type of the liquid-crystal projector in which the liquid-crystal panel as the image display device, and the cross-dichroic prism for composing the three color light beams are provided, is used. However, the present invention is not limited to this type of the projector. The present invention may be applied to projectors which have the reflective type image display device, such as Digital Micromirror Device and so on, or the self-emission type image display device. In addition, the prism used for decomposing or composing the light beams is not limited to the rectangular solid shape of cross-dichroic prism. A prism having one dichroic surface (a polarizing beam splitter), a prism having two dichroic surfaces which are not orthogonal to each other, a cross-dichroic prism having a polished spherical side surface, and so on can be also used.

Various changes and modifications are possible in the present invention and may be understood to be within the present invention.

What is clamed is:

1. A projector comprising:
    an illuminating light source for emitting illuminating light;
    an image display device for modulating said illuminating light into image light;
    a columnar prism having a dichroic surface which outputs light beams in a direction different from an entering direction of said light beam according to their polarization characteristics and wavelength;
    a projection lens for projecting said image light;
    a base plate having a first projection which supports a bottom surface of said prism;
    holding means including a first bracket fixed on a top surface of said prism and a second bracket fixed on said bottom surface of said prism for holding said image display device such that said image display device faces a side surface of said prism;
    a first opening formed on said second bracket for fitting to said first projection so as to position said second bracket on said base plate; and
    an adhesive layer formed with adhesive agent filled into a clearance between said bottom surface of said prism supported on said first projection and said second bracket so as to fix said bottom surface of said prism, said base plate and said second bracket integrally.

2. A projector according to claim 1, wherein said second bracket has a second opening for fitting to a second projection formed on said base plate, and a height of said second projection being larger than a thickness of said second bracket, and being smaller than that of said first projection.

3. A projector according to claim 2, wherein said first bracket has the same shape as said second bracket, and is fixed on said top surface of said prism.

4. A projector according to claim 3, wherein said first and second brackets respectively have a pair of holding arms extending to project approximately perpendicular to said side surface of said prism, and said holding arms being inserted into holes formed on said image display device to hold said image display device.

5. A projector according to claim 4, wherein said image display device is fixed to said holding arms such that said adhesive agent is applied in said holes after said holding arms being inserted into said holes.

6. A projector according to claim 2, wherein plurality of said first brackets are provided to correspond to each said side surfaces of said prism one by one, and each of said first brackets holding each of said image display devices provided in accordance with each of said side surfaces by collaborating with said second bracket.

7. A projector according to claim 6, wherein said image display device includes an attachment frame for being held by said first and second brackets.

8. A projector according to claim 1, wherein said adhesive agent is UV curable resin.

9. A projector according to claim 2, wherein said adhesive agent is UV curable resin.

10. A projector according to claim 3, wherein said adhesive agent is UV curable resin.

11. A projector according to claim 4, wherein said adhesive agent is UV curable resin.

12. A projector according to claim 5, wherein said adhesive agent is UV curable resin.

13. A projector according to claim 6, wherein said adhesive agent is UV curable resin.

14. A projector according to claim 7, wherein said adhesive agent is UV curable resin.

* * * * *